United States Patent [19]
Hall, Jr.

[11] 3,931,453
[45] Jan. 6, 1976

[54] GEOPHONE CASE WITH IMPROVED CABLE ANCHOR

[75] Inventor: Ernest M. Hall, Jr., Houston, Tex.

[73] Assignee: Walker, Hall, Sears, Inc., Houston, Tex.

[22] Filed: Aug. 23, 1974

[21] Appl. No.: 499,868

[52] U.S. Cl. .......... 174/65 R; 24/129 R; 174/52 S; 174/135; 339/105; 340/17
[51] Int. Cl.². G01V 1/16; H01R 13/58; H05K 5/02
[58] Field of Search ............ 174/52 S, 65 R, 65 SS, 174/135; 339/94 R, 94 M, 103 R, 103 B, 103 M, 105, 106, 151 C; 340/7 R, 17; 24/129 R

[56] References Cited
UNITED STATES PATENTS

| | | | |
|---|---|---|---|
| 877,383 | 1/1908 | Swan | 339/105 |
| 877,384 | 1/1908 | Swan | 339/105 |
| 2,283,544 | 5/1942 | Eaton | 339/105 |
| 3,332,057 | 7/1967 | Pavey, Jr. | 340/17 |

FOREIGN PATENTS OR APPLICATIONS

| | | | |
|---|---|---|---|
| 616,646 | 1/1949 | United Kingdom | 339/213 R |
| 575,601 | 5/1959 | Canada | 24/129 R |

Primary Examiner—Laramie E. Askin
Attorney, Agent, or Firm—Michael P. Breston

[57] ABSTRACT

A geophone case with an improved internal cable anchor. The anchor has three parallel bores extending in a longitudinal direction for tightly accepting a cable therethrough, whereby the cable makes two 180° bends which provide the necessary reaction force to the cable.

1 Claim, 6 Drawing Figures

GEOPHONE CASE WITH IMPROVED CABLE ANCHOR

BACKGROUND OF THE INVENTION

During seismic exploration of marshy terrains, geophone cases are implanted in the mud for detecting reflected seismic waves. The case is typically cylindrical and is provided with a conical nose, and a reduced-diameter, cylindrical section which is received by a tool that implants the case in the mud. An electric cable passes in a water-tight fashion through a bore in the cylindrical section. The wires of the cable are connected electrically to the terminals of a geophone housed by the case. It is common practice to provide suitable anchoring means in the internal chamber of the case to prevent the cable from being pulled out from the case.

After the seismic shooting is over, the geophone cases are retrieved from the mud by pulling on their cables. Each cable is adapted to withstand a very hard pull. Strong cables are rated to withstand a pull on the order of 400 pounds. It is therefore essential to properly anchor the cable to the case to prevent a hard pull from breaking the electric connections between the cable and the encased geophone. Various anchors have been proposed and used from simple knots to complicated devices. The known anchors are characterized by certain drawbacks chief among which are; they are difficult to fit inside the case, they are not sufficiently strong, they require special tools for guiding them into the interior chamber of the case, they damage the cable in response to a hard pull, and they are difficult to remove from the chamber of the case for repairs.

SUMMARY OF THE INVENTION

This invention provides an anchor for a geophone case having an interior chamber containing a geophone connected to a cable which passes into the chamber in a water-tight fashion. The anchor secures the cable to the case when a hard pull is exerted on the cable. The anchor has three longitudinally-extending bores, each of a diameter slightly larger than the outside diameter of the cable which is threaded through the bores to form two 180° bends.

DETAILED DESCRIPTION OF THE INVENTION

Figure 1:
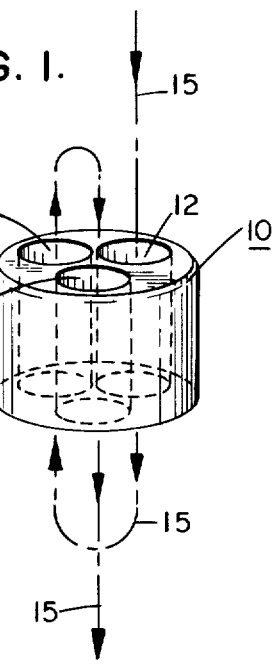
FIG. 1 is a perspective view of the anchor of this invention.
Figure 3:
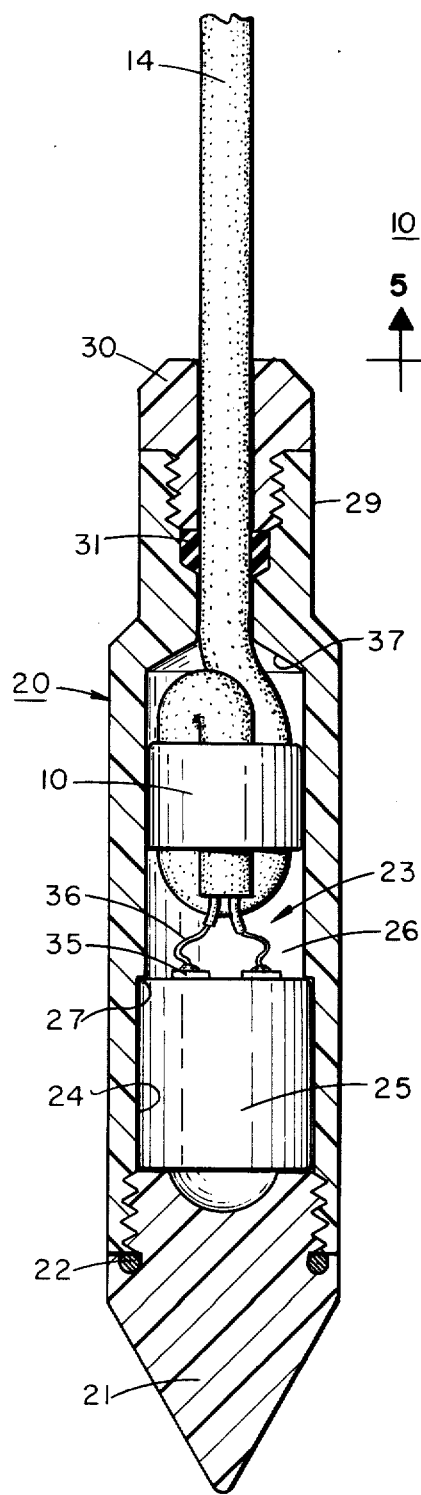
FIG. 3 is a sectional view of a geophone case having a threaded anchor therein.
Figure 2:
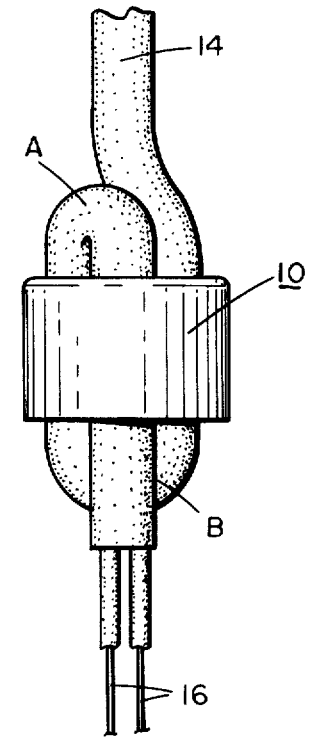
FIG. 2 shows the anchor threaded with a cable.

Throughout the drawings the same reference characters are used to designate the same or similar parts. Referring now to FIGS. 1-3, there is shown one embodiment of an anchor 10 of this invention. The anchor is preferably made of a noncorrosive material such as plastic. Since the anchor will fit inside a chamber, its geometry will be selected to match that of the chamber. Typically, anchor 10 has the form of a right cylinder having three bores 11-13 which are preferably parallel to the longitudinal axis of the cylinder. The diameter of each bore is made slightly larger than the outside diameter of an electric cable 14 which it is desired to thread through bores 11-13 in the direction of the arrows on dotted line 15. Cable 14 includes at least two insulated conductors 16 (FIG. 2). The cable makes two 180° bends A and B.

The geophone case is generally designated as 20 (FIG. 3), and typically has a cylindrical configuration. The interior chamber 23 of the case threadably receives a conical nose 21 against a seal 22. Nose 21 facilitates the implantation of the case into the mud during seismic exploration. In the particular embodiment shown in FIG. 3, chamber 23 is divided into two sections: a geophone section 24 and an anchor section 26 of a slightly smaller diameter to provide a stop shoulder 27 for a geophone 25. Case 20 has a reduced diameter end 29 adapted to fit inside a tool (not shown) which implants the case into the mud. A threaded cap 30 exerts a sufficient pressure against a seal 31 thereby rendering chamber 23 water tight. Seal 31 seals the opening in the front end 29 as well as the opening in cap 30 through which the cable passes.

A pair of flexible pigtails 36 connect the terminals 35 of geophone 25 with the conductors 16 of cable 14. The pigtails have a sufficient length to allow anchor 10 to move upward as far as it can inside its chamber section 26, which is provided with a stop wall 37 against which the bend A abuts when a maximum pull is exerted on cable 14.

In operation, cable 14 is first threaded through anchor 10 in the direction of the arrows on the dotted line 15. The pigtails 36 are soldered between the cable's conductors 16 and the terminals 35 of geophone 25. The anchor and the geophone are then inserted into the chamber section 24 whereby the geophone nests against the stop shoulder 27, and anchor 10 assumes a position approximately midway between shoulder 27 and stop wall 37. Cap 30 is then threadably secured to the front end 29 and the conical nose is threadably secured to the bottom end of case 20. A normal pull on the cable will be resisted by a reaction force provided by bends A and B. For example, in one embodiment a pull of 200 pounds on cable 14 failed to displace anchor 10 from its position inside cavity 26, as shown in FIG. 3. As the pull continues to increase, the anchor slowly moves upward until bend A touches the stop wall 37, thereby forcing cable 14 to make even a sharper bend, thus increasing the reaction force afforded by anchor 10. In this respect, anchor 10 is a self-tightening anchor.

When cable 14 is purchased from a cable manufacturer, it is rated with a maximum pull, typically 400 pounds, and the geophone user desires that anchor 10 withstand such a maximum pull so that the user can take advantage of the full strength of the cable. Whereas most known prior art anchoring devices failed before the cable itself failed, anchor 10 of this invention passed the maximum pull test without causing the cable to break at the anchor.

Some cables have an internal construction which will allow conductors 16 to slide relative to the cable's jacket thereby breaking the electrical connections with the geophone. To prevent this from happening, anchor 10 can be modified so that one of its bores does not extend throughout the entire length of the anchor.

Figure 4:
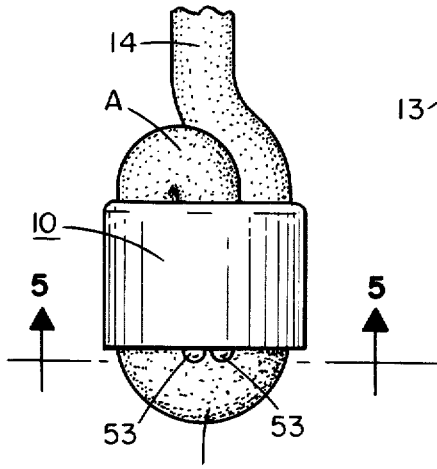
FIG. 4 is a perspective view of a modified anchor.
Figure 5:
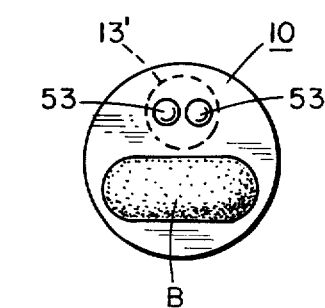
FIG. 5 is an end view on line 5—5 in FIG. 4.
Figure 6:
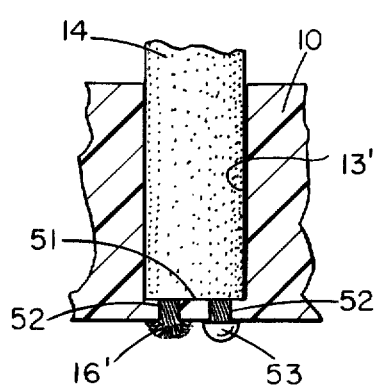
FIG. 6 is a fractional view, in section, through a bore in the modified anchor.

In FIGS. 4-6, bore 13' is shorter than bores 11 and 12 to provide a stop wall 51 having a thickness which may range between one-eighth to one-fourth inch. Stop wall 51 is provided with two holes 52, each having a diameter only slightly larger than that of a conductor 16. Each conductor 16 is typically made from a plurality of strands of wire, and such construction is taken advantage of in the modified anchor embodiment shown in FIGS. 4–6. After the conductors pass through holes 52, their wires are slightly spread apart and then filled with solder to create a "solder ball". One such plug 53 is shown in FIG. 6, while the tip 16' of conductor 16 with its wires spread apart is shown just prior to being soldered. Since each ball 53 is larger than the small hole 52, it will be apparent that conductors 16 are firmly anchored to the stop wall 51.

The advantages of the invention will now become apparent. Inasmuch as the bores are parallel to the longitudinal axis of the cylindrical anchor, and that the cable exits from case 20 in a direction parallel to the bores, an upward pull on the cable will be resisted by reaction forces parallel to the longitudinal axis. For that reason, the threaded anchor 10 can be easily inserted into chamber 23 of the case without the assistance of jigs or special tools. Since the anchor slides parallel to the walls of its chamber 26, it can also be easily removed therefrom regardless of the amount of strain transferred to the anchor by the cable.

The anchor of this invention can be considered as being a dynamic anchor inasmuch as the harder one pulls on it, the more anchoring force it provides. Each geophone case 20 can now be retrieved from the mud by pulling on its cable 14 with a force determined by the strength of the cable rather than by the strength of anchor 10. In the modified embodiment of the anchor shown in FIGS. 4–6, the cable's conductors 16 are additionally secured to the body of the anchor with solder balls to prevent any relative movement between the conductors and the jacket of the cable.

While the invention has been illustrated in the drawings with reference to the specific embodiments thereof, it will be apparent that modifications can be made therein without departing from the scope of the claims attached hereto.

What is claimed is:

1. A case having an interior chamber for housing a geophone, said chamber having an opening accepting therethrough an electric cable, including conductors, in water-tight fashion,
   a cylindrical anchor in the chamber anchoring the cable to the case, said anchoring having at least three substantially parallel bores therethrough, and said three bores extending between and through the top and bottom faces of said anchor,
   said cable making two 180° bends in passing through said bores, whereby an upward pull on said cable is resisted by said bends;
   one of said bores receiving at least one conductor of the cable therethrough, and a solder ball on the tip of the received conductor anchoring the conductor to said anchor.

* * * * *